United States Patent [19]

Saito et al.

[11] Patent Number: 4,700,479
[45] Date of Patent: Oct. 20, 1987

[54] CANT ANGLE SENSOR ASSEMBLY

[75] Inventors: Kaoru Saito, Tokyo, Japan; Akio Noji, Warabi; Yonehiro Kakuta, Ohi; Koichi Takigawa, Niiza, all of Japan

[73] Assignee: Honda Giken Kogyo Kabushiki Kaisha, Tokyo, Japan

[21] Appl. No.: 902,840

[22] Filed: Sep. 2, 1986

[30] Foreign Application Priority Data

Sep. 2, 1985 [JP] Japan ............................ 60-134299[U]
Sep. 5, 1985 [JP] Japan ................................ 60-196608

[51] Int. Cl.$^4$ ........................... G01B 7/00; G01C 9/06
[52] U.S. Cl. ........................................ 33/366; 33/392; 33/402
[58] Field of Search ...................... 33/366, 345, 363 K, 33/391, 392, 402

[56] References Cited

U.S. PATENT DOCUMENTS

| 2,803,887 | 8/1957 | Fry, Jr. .................................. 33/366 |
| 4,277,895 | 7/1981 | Wiklund ................................ 33/366 |
| 4,375,727 | 3/1983 | McAdams, Jr. et al. .............. 33/366 |

FOREIGN PATENT DOCUMENTS

| 544411 | 1/1956 | Belgium ................................ 33/366 |
| 143819 | 9/1980 | Fed. Rep. of Germany ........ 33/366 |
| 60-85311 | 5/1985 | Japan .................................... 33/391 |

Primary Examiner—Willis Little
Attorney, Agent, or Firm—Armstrong, Nikaido, Marmelstein & Kubovcik

[57] ABSTRACT

The present invention is a cant angle sensor assembly which senses the amount of tilt of an object in the longitudinal, transverse and oblique directions and which effectively exhibits a damper action in all directions by a single magnetic damper means.

11 Claims, 8 Drawing Figures

CANT ANGLE SENSOR ASSEMBLY

BACKGROUND OF THE INVENTION

1. Field of the Invention

The present invention relates to a cant angle sensor assembly for sensing the amount of tilt of an object to be measured.

2. Description of the Prior Art

A cant angle sensor assembly senses the tilt state or the amount of tilt of a body of a working vehicle or the like using a plate-shaped pendulum. The pendulum is restricted to swinging in one direction. The motion of the pendulum, when the vehicular body is transversely tilted a predetermined amount, is sensed by a photo-sensor disposed at a predetermined position. In order to prevent the vibrations of a running vehicle, such as the engine vibrations and the like, from being applied as disturbances to the pendulum during the sensing operation, a magnetic braking force is applied to the pendulum by a magnetic damper using an eddy current brake (as disclosed in Japanese Utility Model Laid-Open No. 59-3307). Thus, the cant angle sensor assembly of the prior art senses the amount of tilt of the vehicular body in only one direction. When it is also necessary to sense the longitudinal tilt of the vehicular body, in addition to the transverse tilt, a plurality of cant angle sensor assemblies with magnetic dampers for sensing the various tilts of the vehicular body in respective directions have to be provided.

The prior art also discloses a cant angle sensor assembly which is constructed such that a rod-shaped pendulum is suspended in a freely rocking manner. The pendulum is regulated by guide members which are also hinged in a freely rocking manner respectively to shafts perpendicular to each other. Thus, the pendulum may be moved in two directions (as disclosed in Japanese Utility Model Laid-Open No. 56-153810). However, it is structurally difficult to apply a magnetic braking force commonly in two directions by a single magnetic damper attached to the aforementioned cant angle sensor assembly. It is, therefore, necessary to provide two magnetic dampers for the guide members in the two directions, respectively.

Alternatively, oil dampers in which the pendulum is partially dipped can be used. The oil dampers exhibit a damper effect using the viscosity of oil. The oil dampers may have damper effects highly deviated by changes in the oil viscosity due to the temperature characteristics of the oil. These deviations adversely affect the accuracy of the cant angle sensing operation. Another problem that arises using oil dampers is that an oil sealed structure is required.

SUMMARY OF THE INVENTION

The present invention has been conceived in view of the points described above and has as a first object providing a cant angle sensor assembly which senses the amount of tilt of an object in all directions including longitudinal, transverse and oblique directions and which effectively exhibits a damper action in all directions by a single magnetic damper means.

A second object of the present invention is to provide a cant angle sensor assembly which accurately senses the different tilt states of the object in all the directions including longitudinal, transverse and oblique directions and which effectively exhibits the damper action of a cup-shaped member in all the directions by at least one magnetic damper means.

A third object of the present invention is to provide a cant angle sensor assembly which senses the amount of tilt of the object in all the directions including longitudinal, transverse and oblique directions at independently set cant angles by a simplified structure.

DESCRIPTION OF THE PREFERRED EMBODIMENTS

The present invention will be described in detail in the following description in connection with the embodiments thereof with reference to the accompanying drawings.

Figure 1:
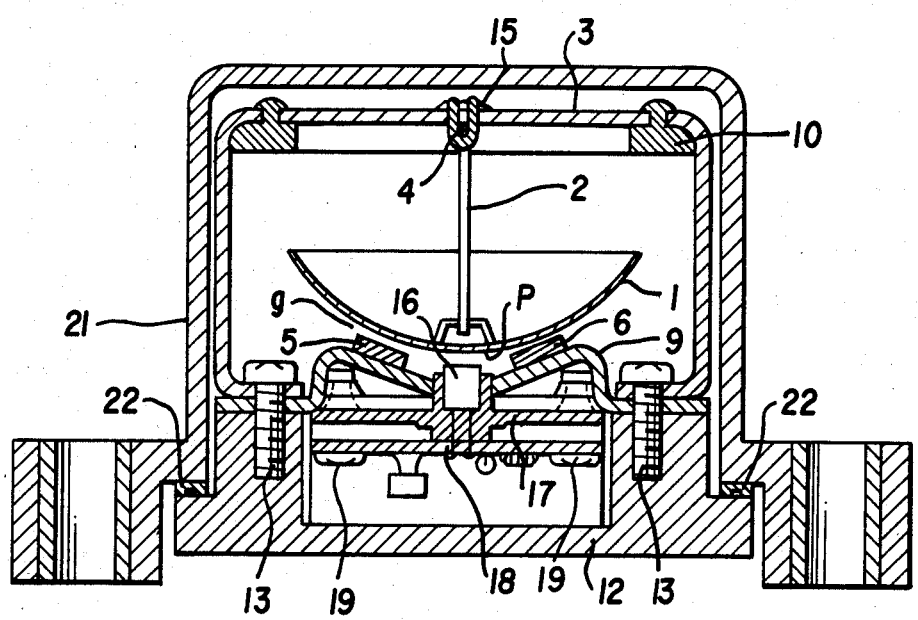
FIG. 1 is a sectional front elevation showing one embodiment of the cant angle sensor assembly according to the present invention.

The cant angle sensor assembly according to the present invention, as shown in FIG. 1, is a pendulum composed of a cup-shaped member 1 made of a conductive, non-magnetic material such as aluminum or copper. The material forms part of a spherical shell. A rod 2 is suspended from a portion of a frame 3 through a hook carrier 4. The rod 2 can rock freely in all directions. Four permanent magnets 5, 6, 7 and 8 (as shown in FIG. 2) are disposed through a gap g below the lower face of the cup-shaped member 1.

Figure 2:
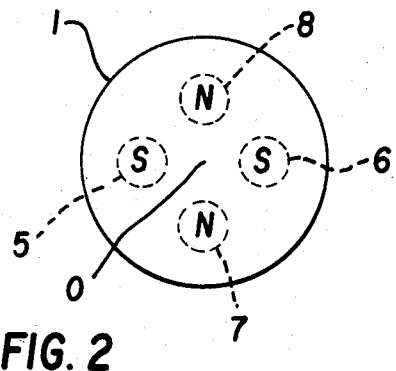
FIG. 2 is a top plan view showing the arranged states of the four magnets with respect to the cup-shaped member in the same embodiment.

The permanent magnets 5, 6, 7 and 8 are equidistantly arranged in a circle which has a center 0 located on the center line of the cup-shaped member 1, as shown in FIG. 2. The magnets are mounted on the respective tangential slopes of a magnet mount 9. The magnet mount 9 is curved in accordance with the shape of the cup-shaped member 1. The paired permanent magnets 5 and 6, and 7 and 8 have polarities opposite to each other with respect to the cup-shaped member 1.

The frame 3 is fastened to a base 12 through the magnet mount 9 by screws 13. A stopper 10 is thermally caulked to a portion of the frame 3. The stopper 10 is made from a synthetic resin or rubber. The stopper retains the end portion of the cup-shaped member 1 when the member 1 is swung at a maximum stroke.

Figure 3B:
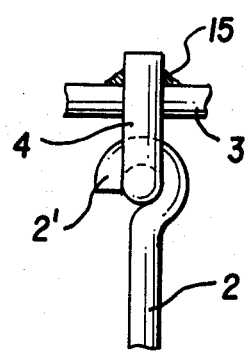
FIG. 3(a) and 3(b) are front and side elevations showing the construction of the pendulum attaching portion of the same embodiments.
Figure 3A:
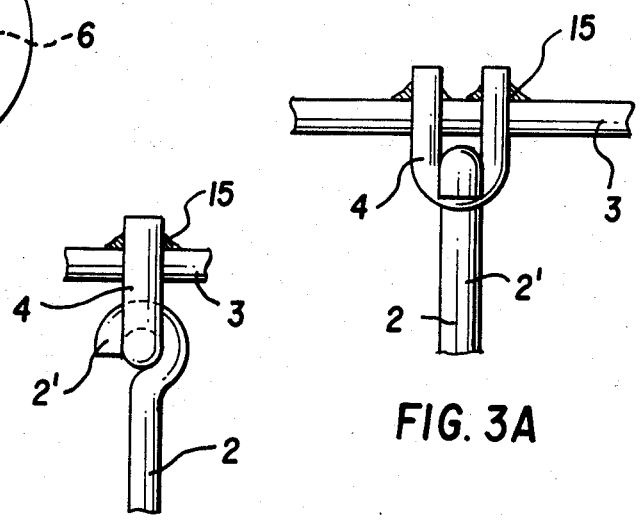

As shown in FIGS. 3(a) and 3(b), the hook carrier 4 is soldered to holes formed in the frame 3. The hook carrier 4 is hooked by a hook portion 2' of a rod 2 to suspend the cup-shaped member 1. Thus, the member 1 can rock freely in all directions without rotation. Reference numeral 15 appearing in the drawings designates a soldered portion.

Figure 4:
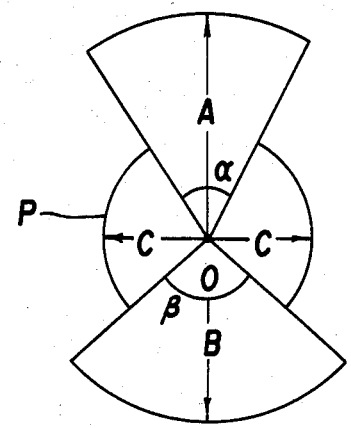
FIG. 4 is a diagram showing one example of the optically reflective pattern.

The central portion of the lower face of the cup-shaped member 1 has applied or printed thereon an optically reflective pattern P which is shaped as shown in FIG. 4. A photo-sensor 16 faces the optically reflective pattern P. The photosensor 16 is a reflection type of photo-sensor. An optical beam irradiates the center 0 of the pattern P when the base 12 is in a horizontal position.

Figure 5:
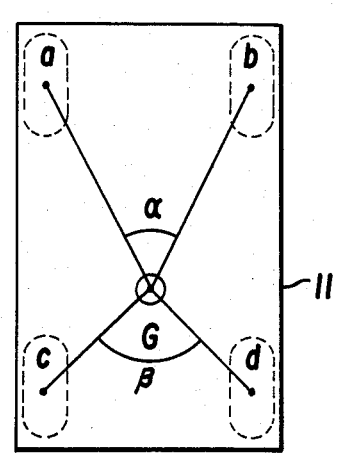
FIG. 5 is a diagram showing the state of the vehicular body according to the optically reflective pattern shown in FIG. 4.

The optically reflective pattern P is formed, as shown in FIG. 5, by drawing circles. The circles have radii A, B, and C on the center 0 with arcuate angles following (a) an angle $\alpha$ made between two lines joining the center of gravity G of the body 11 of a four-wheeled vehicle and the positions a and b of the left and right front wheels and (b) an angle $\beta$ made between two lines joining the center of gravity G and the positions c and d of the left and right rear wheels. Respective cant angles (as indicated by arrows in FIG. 4) are designated the forward cant angle at $\theta A$, the backward cant angle at $\theta B$, and the leftward and rightward cant angles at $\theta C$. The cant angles are set in accordance with the tilting characteristics in the respective directions corresponding to the position of the center of gravity G. On the other hand, the optically reflective pattern P is formed on the bottom of the cup-shaped member 1 to be longitudinally and transversely symmetric with respect to the vehicular body 11. The arcuate angles $\alpha$ and $\beta$, in the optically reflective pattern P, define the boundaries between the tilt in the forward or backward oblique direction and the tilt in the transverse directions of the vehicular body 11.

A photo-sensor unit 17 has a photo-sensor 16 and a printed board 18 which are arranged below the photo-sensor. The photo-sensor and printed board are attached together to the side of the magnet mount 9 by screws 19. Moreover, the printed board 18 has an electric circuit for sensing the amount of tilt of the base 12 in terms of the output state of the photo-sensor 16. In FIG. 1, reference numerals 21 and 22 designate an outer casing and a packing, respectively.

In the structure thus made, the cup-shaped member 1 has a pendulum constructions in which it can rock freely in all directions. As a result, when the cant angle sensor assembly is mounted on a vehicle in order to sense the tilt of the vehicular body 11, the cup-shaped member 1 will rock in accordance with the amount of tilt of the body 11 in all directions, such as longitudinal, transverse and oblique. If the vehicular body 11 tilted in a certain direction exceeds a predetermined cant angle, the circular, optically reflective pattern P of the cup-shaped member 1 misses the photo-sensor 16. Therefore, the optical beam emitted from a light emitting element is neither reflected nor received by a light receiving element. This means that when a predetermined angle is exceeded by the body 11, the tilt state of the body 11 is detected by the photo-sensor 16.

Thus, the shape and size of the optically reflective pattern P is determined by the tilt characteristics of the position of the center of gravity G and the wheel positions of the vehicular body 11. By merely changing the optically reflective pattern P, a predetermined cant angle sensing operation in all directions for a variety of vehicular bodies can be easily handled.

Thus, in the present invention the optically reflective pattern P is formed on the bottom of the cup-shaped member 1 so that the pattern can be sensed by the optically reflective type photo-sensor 16.

This means that it is unnecessary to form sensing holes, as required when an optically transmissive type photo-sensor is used. It is, therefore unnecessary to consider problems of either (a) unevenness of the magnetic damper force due to the weight distribution of the cup-shaped member or the hole positions or (b) a drop in the magnetic damper force experienced when assymetric holes for the sensing pattern are formed.

According to the present invention, using the optically reflective type photo-sensor means allows the rocking state of the cup-shaped member 1 exceeding a predetermined angle to be optically sensed at the lower side of the cup-shaped member by the magnetic damper force. The damper force is always constant and uniform in all the directions and does not obstruct the rocking motion in any direction.

Moreover, the four permanent magnets 5, 6, 7 and 8 are arranged below the lower face of the cup-shaped member 1 so that the rocking motion of the pendulum will not be obstructed in any direction. The respective permanent magnets 5, 6, 7 and 8 are arranged to be tangentially tilted in order to construct the magnetic damper. As a result, the magnetic flux will be sufficiently present in the spaces between the respective magnets, in contrast to the case when the premanent magnets 5, 6, 7 and 8 are merely arranged in a horizontal position. The present arrangement establishes a relatively high eddy current in the cup-shaped member 1 so that a sufficient magnetic braking force is exerted substantially uniformly in all directions upon the cup-shaped member 1. The uniform braking force prevents the vehicular running vibrations and the engine vibrations from being applied as disturbances to the cup-shaped member 1 thereby preventing the member 1 from being slightly vibrated. Thus, the damper action of the pendulum in all directions can be effectively exhibited.

Incidentally, the permanent magnets may be replaced by electromagnets, respectively. On the other hand, although the number of the magnets arranged in the present embodiment is four, the number may be two. However, as the number if magnets becomes larger, the magnet braking force exerted upon the pendulum becomes stronger.

Figure 6:
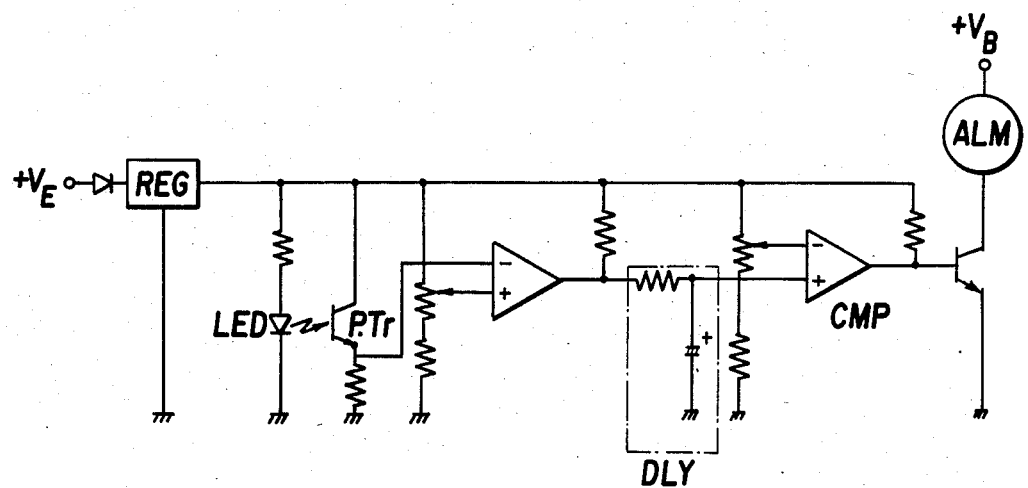
FIG. 6 is a circuit diagram showing a specific example of the circuitry of the system for sensing the tilt state of the vehicular body by the photo-sensor.

FIG. 6 shows a specific example of the circuitry of the system for sensing the amount of tilt of the vehicular body using the photo-sensor. When the optical beam emitted from a light emitting diode LED (i.e., a light emitting diode) is received by a photo transistor P Tr (i.e., a light receiving element), the output of a comparator CMP becomes low and inhibits an alarm ALM from operating. When the optical beam emitted from the LED is shielded, as described above, so that the beam is not received by the photo transistor P Tr, the output of the comparator CMP becomes high so that the alarm ALM indicates that the vehicular body has been tilted to at least a predetermined angle. Reference letters REG appearing in FIG. 6 designate a three-terminal regulator. An RC delay circuit DLY is connected to an input terminal of the comparator CMP to prevent the alarm ALM from being operated by a temporary shielding of the optical element when the cup-shaped member is instantly rocked by a large stroke by acceleration modes of the vehicle such as when starting, stopping, accelerating or decelerating.

Figure 7:
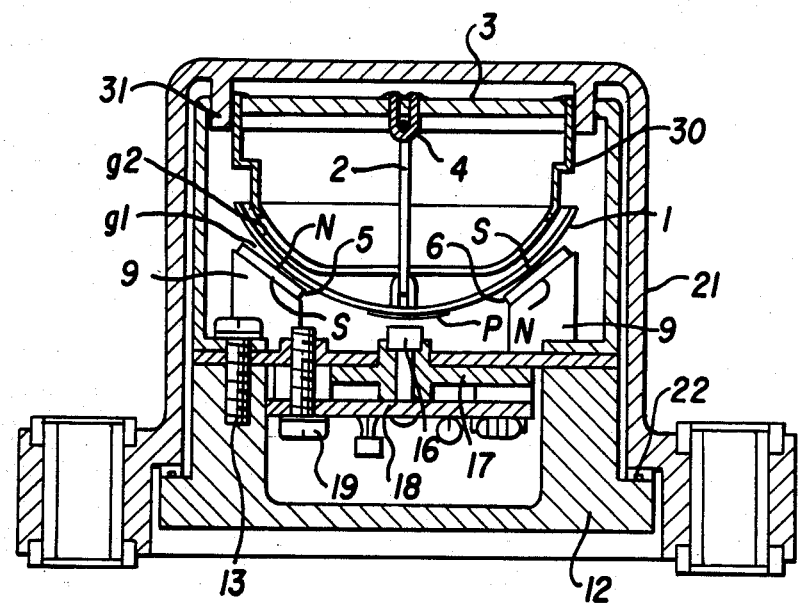
FIG. 7 is a sectional front elevation showing another embodiment.

Next, another embodiment will be described with reference to FIG. 7 (in which the parts shared with FIG. 1 are designated by common reference numerals so that their description will be omitted).

A magnetic force assisting member 30 is made of magnetic material and has a cylindrical shape. The member 30 is attached to the side of the frame 3 at the upper face of the cup-shaped member 1. The the member 30 partially faces the member 1 through a gap g2. The rod 2 is positioned at the center of the member 30. The magnetic force assisting member 30 thus attached is sized so that the rod 2 is not brought into abutting contact with the magnetic force assisting member 30 even if the cup-shaped member 1 is swung at the predetermined cant angle. Moreover, the outer casing 21 is formed integrally with a stopper 31 which is made of a resin. The stopper 31 retains the end portion of the cup-shaped member 1 when member 1 is swung to a full stroke. However, the rocking range of the cup-shaped member 1 may be regulated by the magnetic force assisting member 30 without any special provision for a stopper 31.

Thus, the magnetic damper is arranged with the four permanent magnets 5, 6, 7 and 8 at the lower face of the cup-shaped member 1 and the magnetic force assisting member 30 at the upper face of the cup-shaped member 1. The magnetic damper interposes the cup-shaped member 1 through the respective gaps g1 and g2. As a result, the eddy current generated in the cup-shaped member 1 is increased by the action of the magnetic force assisting member 30. As a result, a sufficient magnetic braking force is excited upon the cup-shaped member 1 so that the member 1 is prevented from being slightly vibrated by the vehicular running vibrations and the engine vibrations which might otherwise act as disturbances. As a result, the damper action of the pendulum in all directions can be effectively exhibited.

In this instance, the magnetic braking force exerted upon the pendulum can be adjusted by widening or narrowing the gap g1 to suitably change the spacings between the respective permanent magnets 5, 6, 7 and 8 and the magnetic force assisting member 30.

As has been described herein, the cant angle sensor assembly according to the present invention accurately senses the amount of tilt in the longitudinal, transverse and oblique directions and effectively exhibits the damper action of the cup-shaped member in all directions by the magnetic damper. According to another advantage, the cant angle sensor assembly is enabled by sensing the amount of tilt in the respective direction by cant angles which are set independently of one another in respective directions.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A cant angle sensor assembly comprising:
   non-magnetic, conductive cup-shaped member;
   pendulum means suspending said non-magnetic, conductive cup-shaped member in a manner to freely rock in all directions;
   at least two magnet means;
   magnetic damper means with a stationary side along one face side of said cup-shaped member, said magnetic damper means including said at least two magnet means arranged on said stationary side along one face side of said cup-shaped member through a gap, said at least two magnet means having polarities opposite to each other with respect to said cup-shaped member; and
   photo-sensor means for sensing the rocking state of said cup-shaped member in said all directions, said photo-sensor means includes an optically reflective pattern formed on the bottom of said cup-shaped member and a photo-sensor disposed at said stationary side of said magnetic damper means in a position to face said optically reflective pattern and to coact with said optically reflective pattern to sense the rocking state of said cup-shaped member in said all directions.

2. A cant angle sensor assembly as set forth in claim 1, wherein said photo-sensor is arranged to interpose inbetween said magnet means.

3. A cant angle sensor assembly as set forth in claim 2, wherein said optically reflective pattern is made by forming circles, said circles has radii corresponding to cant angles set individually in respective directions of an object to be measured, said circles are concentric of arcuate angles which are made between lines substantially joining the center of gravity of said object and the points of said object contacting the ground.

4. A cant angle sensor assembly comprising:
   non-magnetic, conductive cup-shaped member;
   pendulum means suspending said non-magnetic, conductive cup-shaped member in a manner to freely rock in all directions;
   a magnetic means;
   magnetic damper means for exerting a magnetic force upon said cup-shaped member, said magnetic damper means including said magnetic means arranged on a stationary side of said magnetic damper means along one face side of said cup-shaped member through a first gap;
   a magnetic force assisting member arranged on said stationary side of said magnetic damper means at the other face of said cup-shaped member through a second gap; and
   photo-sensor means for sensing the rocking state of said cup-shaped member in said all directions, said photosensor means includes an optically reflective pattern formed on the bottom of said cup-shaped member and a photosensor disposed at said stationary side of said magnetic damper means in a position to face said optically reflective pattern and to coact with said optically reflective pattern for sensing the rocking state of said cup-shaped member in said all directions.

5. A cant angle sensor assembly as set forth in claim 4 wherein said photosensor is arranged to interpose inbetween said magnetic damper means.

6. A cant angle sensor assembly as set forth in claim 5, wherein said optically reflective pattern is made by forming circles, said circles having radii corresponding to cant angles set individually in respective directions of an object to be measured, said circles are concentric of arcuate angles which are made between lines substantially joining the center of gravity of said object and the points of said object contacting the ground.

7. A cant angle sensor assembly comprising:
   non-magnetic, conductive cup-shaped member;

pendulum means suspending said non-magnetic, conductive cup-shaped member in a manner to freely rock in all directions;

at least two magnetic means;

magnetic damper means for providing a constant, uniform damper force in all directions, said damper force not obstructing the rooking motion in any directions, said magnetic damper means having a stationary side along one face side of said cup-shaped member, said magnetic damper means including said at least two magnetic means arranged on said stationary side along one face side of said cup-shaped member through a gap, said at least two magnetic means having polarities opposite to each other with respect to said cup-shaped member; and photo-sensor means for sensing the rocking state of said cup-shaped member in said all directions.

8. A cant angle sensor assembly as set forth in claim 7, further including a magnetic force assisting member arranged on said stationary side of said magnetic damper means at the other face of said cup-shaped member through a second gap.

9. A cant angle sensor assembly as set forth in claim 7, wherein said photosensor means includes an optically reflective pattern formed on the bottom of said cup-shaped member and a photosensor disposed at said stationary side of said magnetic damper means in a position to face said optically reflective pattern and to coact with said optically reflective pattern for sensing the rocking state of said cup-shaped member in said all directions.

10. A cant angle sensor assdmbly as set forth in claim 7, wherein said photosensor is arranged to interpose in between said magnetic damper means.

11. A cant angle sensor assembly as set forth in claim 7, wherein said optically relfective pattern is made by forming circles, said circles having radii corresponding to cant angles set individually in respective directions of an object to be measured, said circles are concentric of arcuate angles which are made between lines substantially joining the center of gravity of said object and the points of said object contacting the ground.

* * * * *